United States Patent
Zhou et al.

(10) Patent No.: US 8,228,810 B2
(45) Date of Patent: Jul. 24, 2012

(54) MULTIPLE-INPUT MULTIPLE-OUTPUT (MIMO) COMMUNICATION METHOD AND SYSTEM OF ENABLING THE METHOD

(75) Inventors: Yongxing Zhou, Yongin-si (KR); Joon-Il Choi, Seoul (KR); Sung Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 12/144,934

(22) Filed: Jun. 24, 2008

(65) Prior Publication Data

US 2009/0046594 A1 Feb. 19, 2009

(30) Foreign Application Priority Data

Aug. 17, 2007 (KR) .................. 10-2007-0083006

(51) Int. Cl.
*G06F 11/00* (2006.01)

(52) U.S. Cl. ........................................ 370/252; 370/208

(58) Field of Classification Search .................. 370/334, 370/343, 344, 252; 375/347
See application file for complete search history.

(56) References Cited

U.S. PATENT DOCUMENTS

| | | | |
|---|---|---|---|
| 2006/0209764 A1* | 9/2006 | Kim et al. | 370/334 |
| 2007/0058590 A1* | 3/2007 | Wang et al. | 370/334 |
| 2008/0165875 A1* | 7/2008 | Mundarath et al. | 375/262 |
| 2008/0207135 A1* | 8/2008 | Varadarajan et al. | 455/69 |
| 2008/0229177 A1* | 9/2008 | Kotecha | 714/776 |
| 2011/0122971 A1* | 5/2011 | Kim et al. | 375/316 |

* cited by examiner

*Primary Examiner* — Derrick Ferris
*Assistant Examiner* — Matthew Hopkins
(74) *Attorney, Agent, or Firm* — NSIP Law

(57) ABSTRACT

A Multiple-Input Multiple-Output (MIMO) communication method and system, the MIMO communication system including: a first channel quality information (CQI) receiving unit to receive first CQI from a user terminal, the first CQI associated with a beamforming vector selected by the user terminal; and a second CQI generating unit to generate second CQI by correcting the first CQI based on a transmission rank associated with a number of data streams to be transmitted.

23 Claims, 4 Drawing Sheets

MULTIPLE-INPUT MULTIPLE-OUTPUT (MIMO) COMMUNICATION METHOD AND SYSTEM OF ENABLING THE METHOD

CROSS-REFERENCE TO RELATED APPLICATION

This application claims the benefit of Korean Patent Application No. 2007-83006, filed Aug. 17, 2007, in the Korean Intellectual Property Office, the disclosure of which is incorporated herein by reference.

BACKGROUND OF THE INVENTION

1. Field of the Invention

Aspects of the present invention relate to Multiple-Input Multiple-Output (MIMO) communication technology that transmits signals via a plurality of antennas, and more particularly, to a MIMO communication system and method that more effectively embodies a communication system based on channel quality information (CQI) fed back from a user terminal in a MIMO communication technology.

2. Description of the Related Art

According to multiple antenna technology, a data rate can be increased with multiple transmitting and/or receiving antennas, without adding frequencies and without increasing power. The multiple antenna technology transmits signals via multiple antennas to thereby obtain a diversity effect.

However, when transmitting a plurality of data streams, interference may occur between channels. Accordingly, a complex receiver is used to reduce the interference between the channels. In this case, precoding may effectively reduce the interference between the channels. Generally, a precoding scheme can be classified into a linear preceding scheme and a non-linear precoding scheme. Currently, research on the linear precoding schemes (such as a zero-forcing (ZF) beamforming scheme, a Per-User Unitary Rate Control (PU2RC) scheme, etc.) is ongoing.

In a conventional Multiple-Input Multiple-Output (MIMO) communication system, each of a plurality of user terminals feeds back channel quality information (CQI) to a base station. The base station performs various types of operations (such as selecting a beamforming vector) based on the received CQI. Each of the user terminals generates the CQI when a transmission rank is 1 and feeds back the generated CQI to the base station.

When a plurality of users exists or when the transmission rank is greater than 2, many problems may occur when the base station uses the CQI as is. That is, when the plurality of users exists or when the transmission rank is greater than 2, interference may exist between user terminals. Accordingly, the CQI may be inaccurate.

The ZF beamforming scheme and the PU2RC scheme each have advantages and disadvantages based on a respective radio environment. For example, the PU2RC scheme selects a set of at least one user terminal from the plurality of user terminals based on a sum of data rates and the like, and allocates a unitary preceding matrix to the user terminal that belongs to the selected set. When a large number of user terminals exist, the PU2RC scheme is generally effective. Conversely, when a small number of user terminals exist, there may be a wasted beamforming vector. As a result, the PU2RC scheme may be ineffective while the ZF beamforming scheme may be more effective. Accordingly, there is a need for a MIMO communication system that can flexibly select between the ZF beamforming scheme and the PU2RC scheme based on a radio environment.

In other words, there is a need for a MIMO communication system and method that enables a base station to obtain accurate CQI and flexibly determines a beamforming mode to thereby effectively cope with a changing radio environment.

SUMMARY OF THE INVENTION

Aspects of the present invention provide a Multiple-Input Multiple-Output (MIMO) communication system and method that can correct channel quality information (CQI) fed back from a user terminal based on a transmission rank or a number of user terminals to thereby enable a base station to more accurately identify the CQI. Aspects of the present invention also provide a MIMO communication system and method that can flexibly determine a beamforming mode based on corrected CQI to thereby perform beamforming suitable for a radio environment. Furthermore, aspects of the present invention also provide a MIMO communication system and method that can select an MCS level based on corrected CQI to thereby more effectively use a link adaptation scheme according to a changing radio environment. Finally, aspects of the present invention also provide a MIMO communication system and method that can enable a base station to perform signaling, to a user terminal, with indication information associated with a beamforming vector corresponding to the user terminal, a determined beamforming mode, and the like, to thereby more effectively transmit and receive data.

According to an aspect of the present invention, there is provided a MIMO communication system, the system including: a first CQI receiving unit to receive first CQI from a user terminal, the first CQI associated with a beamforming vector selected by the user terminal; and a second CQI generating unit to generate second CQI by correcting the first CQI based on a transmission rank associated with a number of data streams to be transmitted.

In an aspect of the invention, the MIMO communication system may further include a beamforming mode determining unit to determine a beamforming mode based on the second CQI.

In an aspect of the invention, the MIMO communication system may further include a modulation coding scheme (MCS) level selecting unit to select an MCS level corresponding to a radio channel based on the second CQI.

In an aspect of the invention, the MIMO communication system may further include an indication information transmitting unit to transmit to the user terminal first indication information associated with the beamforming vector, second indication information associated with the transmission rank, and/or third indication information associated with the beamforming mode.

In an aspect of the invention, the MIMO communication system may further include a beamformer to generate a transmission signal by beamforming the data stream using a beamforming vector according to the determined beamforming mode.

According to another aspect of the present invention, there is provided a MIMO communication method, the MIMO communication method including: receiving first CQI from a user terminal, the first CQI associated with a beamforming vector selected by the user terminal; and generating second CQI by correcting the first CQI based on a transmission rank associated with a number of data streams to be transmitted.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
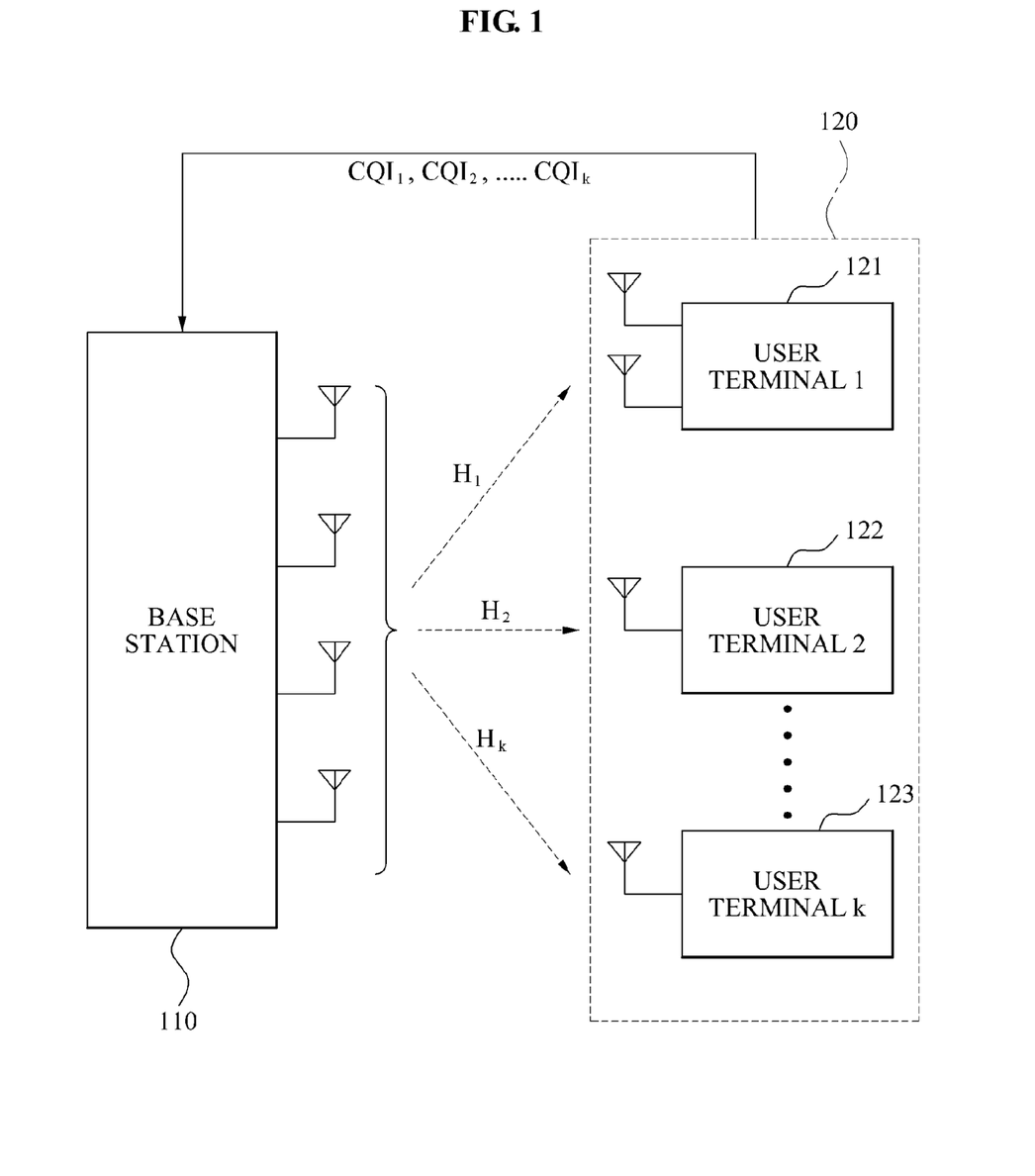
FIG. 1 illustrates an example of a Multiple-Input Multiple-Output (MIMO) communication system according to an embodiment of the present invention.

FIG. 1 illustrates an example of a Multiple-Input Multiple-Output (MIMO) communication system according to an embodiment of the present invention. Referring to FIG. 1, the MIMO communication system includes a base station 110 and a user terminal set 120. The user terminal set 120 includes a plurality of user terminals (a user terminal (1) 121, a user terminal (2) 122, and a user terminal (k) 123). Though three user terminals 121, 122, and 123 are illustrated in FIG. 1, it is understood that aspects of the present invention are not limited thereto, and the user terminal set 120 may include more or less than three user terminals 121, 122, and 123. The user terminal may be a computer, a mobile apparatus, a personal digital assistant, a portable multimedia player, etc.

The base station 110 transmits and/or receives data via multiple antennas. Each of the user terminals 121, 122, and 123 includes at least one antenna. Radio channels $H_1$, $H_2$, and $H_k$ are formed between the base station 110 and the user terminals 121, 122, and 123, respectively. A generated transmission signal is transmitted from the base station 110 to the user terminals 121, 122, and 123 via the plurality of antennas along the radio channels $H_1$, $H_2$, and $H_k$, respectively.

The base station 110 and/or the user terminals 121, 122, and 123 store a codebook that includes at least one precoding matrix. Furthermore, the base station 110 transmits a pilot signal to the user terminals 121, 122, and 123, such that the user terminals 121, 122, and 123 estimate the radio channels $H_1$, $H_2$, and $H_k$, respectively, based on the pilot signal. Each of the user terminals 121, 122, and 123 selects its own precoding matrix and beamforming vector based on each of the estimated radio channels $H_1$, $H_2$, and $H_k$.

Also, each of the user terminals 121, 122, and 123 feeds back channel quality information (CQI) of its own radio channel to the base station 110 using a selected beamforming vector. Accordingly, the base station 110 selects the beamforming vector based on the fed back CQI and performs beamforming for a data stream using the selected beamforming vector.

Each of the user terminals 121, 122, and 123 calculates the corresponding CQI based on when a transmission rank is 1. Thus, the fed back CQI may not consider when multiple users or a plurality of data streams exist. Accordingly, when the base station 110 performs beamforming for the plurality of data streams using a plurality of beamforming vectors to thereby generate a transmission signal and transmit the transmission signal to the plurality of user terminals 121, 122, and 123, interference may occur between the plurality of user terminals 121, 122, and 123. As a result, the CQI may be inaccurate.

A signal received by a user terminal k may be calculated according to Equation 1:

$$y_k = H_k G_k u_k + n_k \qquad (1)$$

In Equation (1), $y_k$ is the signal received by the user terminal k, $H_k$ is a channel matrix, $G_k$ is a beamforming vector, $u_k$ is a data stream, and $n_k$ is noise.

When M number of antennas are installed in a base station 110 and $n_r$ number of antennas are installed in the user terminal k 123, $H_k$ may have an $(N_r \times M)$ dimension and $G_k$ may have an $(M \times 1)$ dimension. The user terminal k 123 may combine signals received via a plurality of radio channels using a combiner $w_k$. After the user terminal k 123 performs the combining, an output signal $z_k$ may be represented according to Equation 2:

$$w_k = \frac{(H_k G_k)^H}{\|(H_k G_k)^H\|}. \qquad (2)$$

In Equation (2), $w_k$ is the combiner that has a $(1 \times N_r)$ dimension.

The output signal $z_k$ that is obtained after performing the combining may be expressed to include an effective channel $h_{\mathit{eff},k}$ according to Equation 3:

$$z_k = h_{\mathit{eff},k} G_k u_k + n_{\mathit{eff},k} \qquad (3)$$

Figure 2:
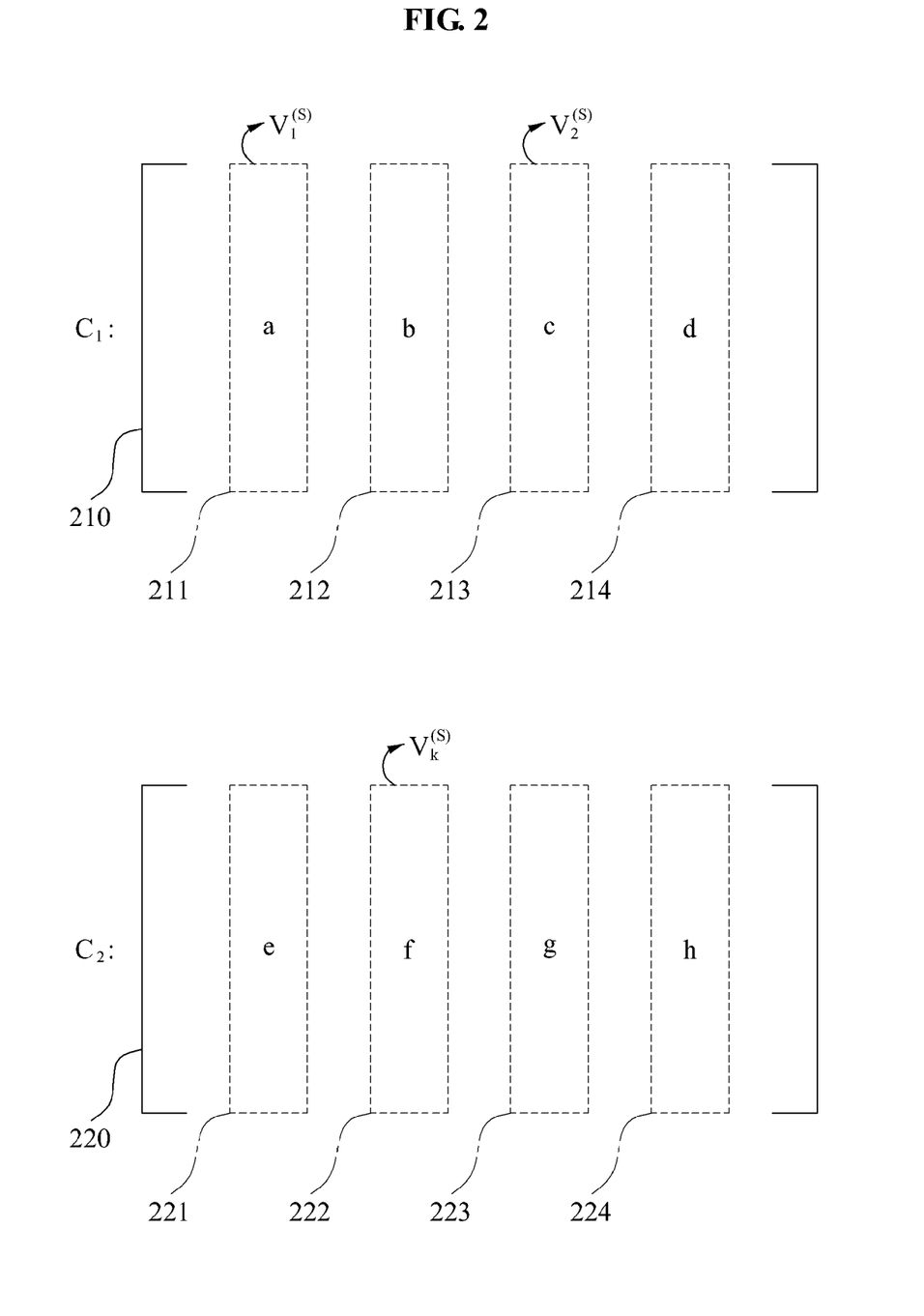
FIG. 2 illustrates an example of a precoding matrix included in a codebook according to an embodiment of the present invention.

FIG. 2 illustrates an example of a precoding matrix included in a codebook according to an embodiment of the present invention. Referring to FIG. 2, the codebook may be pre-stored in each user terminal 121, 122, and 123 and includes a first preceding matrix ($C_1$) 210 and a second precoding matrix ($C_2$) 220. The first preceding matrix ($C_3$) 210 includes a vector (a) 211, a vector (b) 212, a vector (c) 213, and a vector (d) 214. The second precoding matrix ($C_2$) 220 includes a vector (e) 221, a vector (f) 222, a vector (g) 223, and a vector (h) 224. Hereinafter, the example of the precoding matrix will be described with reference to FIG. 2.

Each of the user terminals 121, 122, and 123 receives a pilot signal and estimates a radio channel based on the pilot signal. Accordingly, each of the user terminals 121, 122, and 123 selects its own respective beamforming vector based on the estimated radio channel. Specifically, each of the user terminals 121, 122, and 123 selects the beamforming vector to maximize a result of a multiplication between the estimated radio channel and the beamforming vectors.

A first user terminal 121, a second user terminal 122, and a user terminal k 123 select, as the beamforming vector, $v_1^{(s)}$, $v_2^{(s)}$, and $v_k^{(s)}$, respectively. Then, each of the user terminals 121, 122, and 123 feeds back first CQI associated with the selected beamforming vector to the base station 110.

Based on the beamforming vector $v_k^{(s)}$ that is selected by the user terminal k 123, the effective channel $h_{eff,k}$ may be represented according to Equation 4:

$$h_{eff,k} = \|h_{eff,k}\| \overline{h_{eff,k}} = \|h_{eff,k}\| \left(v_k^{(g)} + e_k\right)^H. \quad (4)$$

In Equation (4), $\|h_{eff,k}\|$ is a size of the effective vector $h_{eff,k}$, $\overline{h_{eff,k}}$ is a directional vector of the effective vector $h_{eff,k}$, and $e_k$ is an error vector.

According to an aspect of the present invention, an error that occurs when the direction of $v_k^{(s)}$ does not accurately match the direction of $h_{eff,k}$ is expressed as the error vector $e_k$.

When the transmission rank is 1, the user terminal k 123 may generate the first CQI $CQI_{MRC,k}$ according to Equation 5:

$$CQI_{MRC,k} = \frac{P|h_{eff,k} v_k^{(s)}|^2}{1} \quad (5)$$

$$= P\|h_{eff,k}\|^2 \left|(v_k^{(s)})^H v_k^{(s)} + e_k^H v_k^{(s)}\right|^2$$

$$= P\|h_{eff,k}\|^2 |1 + e_k^H v_k^{(s)}|^2.$$

In Equation (5), P is a power of the transmission signal in the base station.

Figure 3:
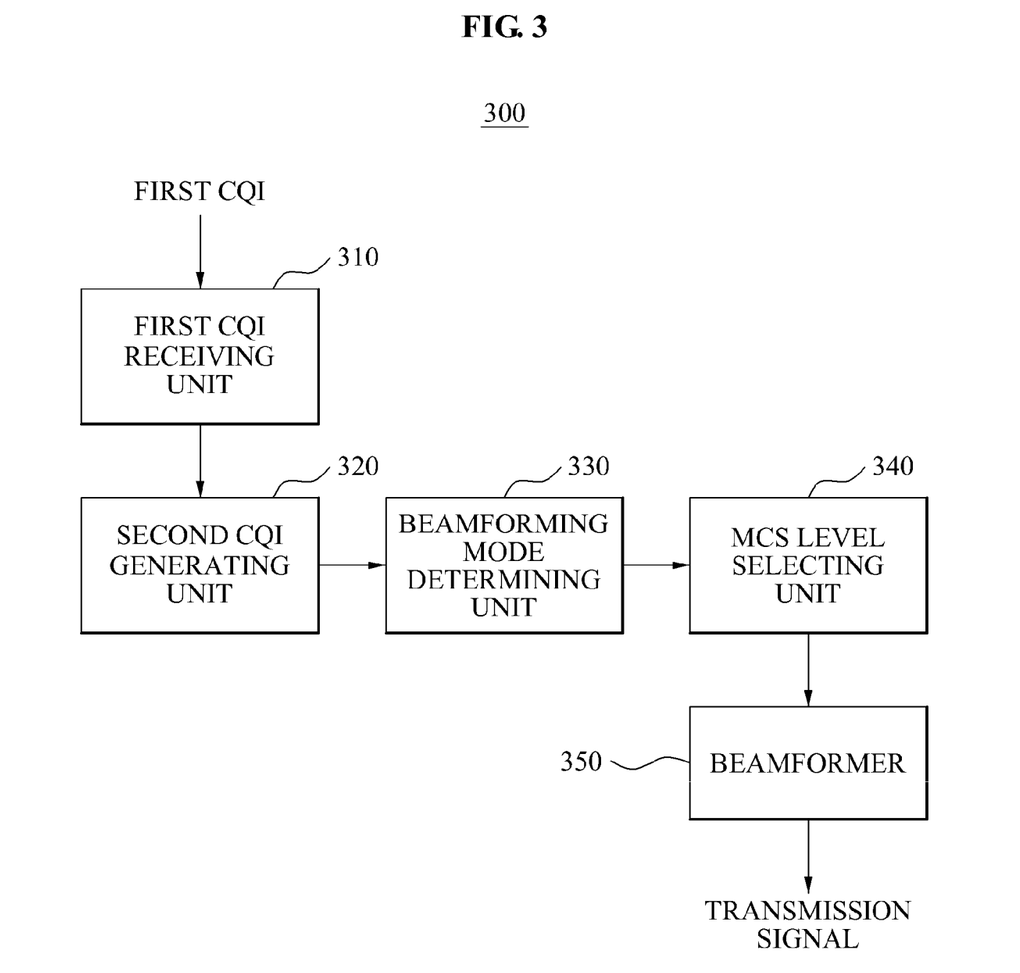
FIG. 3 is a block diagram illustrating an internal configuration of a MIMO communication system according to an embodiment of the present invention.

FIG. 3 is a block diagram illustrating an internal configuration of a MIMO communication system 300 according to an embodiment of the invention. Referring to FIG. 3, the MIMO communication system 300 includes a first CQI receiving unit 310, a second CQI generating unit 320, a beamforming mode determining unit 330, a modulation coding scheme (MCS) level selecting unit 340, and a beamformer 350.

The first CQI receiving unit 310 receives, from a user terminal k 123, first CQI associated with a beamforming vector selected by the user terminal k 123. The user terminal k feeds back first CQI $CQI_{MRC,k}$ when the transmission rank is 1, as shown in Equation 5.

The second CQI generating unit 320 generates second CQI by correcting the first CQI based on a transmission rank associated with a number of data streams to be transmitted. While not required in all aspects, the second CQI generating unit 320 may generate the second CQI based on a remaining beamforming vector $k_k^{(y)}$ that is selected by at least one user terminal 121 and/or 122 that is different from the user terminal k 123. Alternatively, the second CQI generating unit 320 may generate the second CQI to include zero-forcing (ZF)-CQI associated with a ZF beamforming scheme, Per-User Unitary Rate Control (PU2RC)-CQI associated with a PU2RC scheme, and/or spatial division multiplexing access (SDMA)-CQI associated with a SDMA scheme.

For example, if the user terminal k 123 feeds back to the base station 110 first CQI when the transmission rank is 1, (such as $CQI_{MRC,k}$ in Equation 5), the second CQI generating unit 320 may generate the PU2RC-CQI associated with the PU2RC scheme by correcting the first CQI $CQI_{MRC,k}$. The PU2RC-CQI $CQI_{k,PU2RC}$ may be represented according to Equation 6:

$$CQI_{k,PU2RC} = \frac{\frac{P}{r}|h_{eff,k} v_k^{(s)}|^2}{\frac{P}{r}\sum_y |h_{eff,k} v_k^{(y)}|^2 + 1} \quad (6)$$

-continued $$= \frac{\frac{1}{r}|1 + e_k^H v_k^{(s)}|^2}{\frac{1}{r}\sum_y \left|(v_k^{(s)})^H v_k^{(y)} + e_k^H v_k^{(y)}\right|^2 + \frac{1}{CQI_{MRC,k}}|1 + e_k^H v_k^{(s)}|^2}.$$

In Equation (6), r is the transmission rank corresponding to the number of data streams to be transmitted and y is the index of the other user terminal 121 or 122 that is different from the user terminal k 123.

Thus, the PU2RC-CQI $CQI_{k,PU2RC}$ is generated by correcting the first $CQI_{MRC,k}$ based on the transmission rank r (i.e., the transmission rank corresponding to the number of data streams to be transmitted) and the remaining beamforming vector selected by the other user terminal 121 or 122. As described above, $CQI_{MRC,k}$ is the first CQI when the transmission rank is 1. Accordingly, since $CQI_{MRC,k}$ relates to when the transmission rank is 1, the second CQI generating unit 320 may generate $CQI_{k,PU2RC}$ based on the actual transmission rank r and interference caused by the existence of the remaining beamforming vector.

Since the second CQI generating unit 320 may not be aware of $e_k$, it is possible to calculate an approximate value of $CQI_{k,PU2RC}$ according to a limit as given by the following Equation 7:

$$CQI_{k,PU2RC} \geq CQI_{k,PU2RC,lower\ bound} = \quad (7)$$

$$\frac{\frac{1}{r}\left\{\max\left(1 - \sqrt{2\left(1 - \cos\frac{\theta_{max}}{2}\right)}, 0\right)\right\}^2}{\frac{1}{r}\sum_y \left\{\left|(v_k^{(s)})^H v_k^{(y)}\right| + \sqrt{2\left(1 - \cos\frac{\theta_{max}}{2}\right)}\right\}^2 + \frac{1}{CQI_{MRC,k}}\left(1 - \sqrt{2\left(1 - \cos\frac{\theta_{max}}{2}\right)}\right)^2}.$$

In Equation (7), $\theta_{max}$ is a maximum angle between adjacent beamforming vectors. $\theta_{max}$ may decrease as the size of the codebook increases, or as the number of beamforming vectors increases.

When a plurality of antennas is installed in the user terminal k 123, the second CQI generating unit 320 may estimate $CQI_{k,PU2RC,average}$, which is an average of $CQI_{k,PU2RC}$, according to a limit as given by the following Equation 8:

$$\log(1 + CQI_{k,PU2RC,average}) = \quad (8)$$

$$\frac{1}{2}\{\log(1 + CQI_{k,PU2RC,lower\ bound}) + \log(1 + CQI_{k,PU2RC,upper\ bound})\} =$$

$$\frac{1}{2}\left\{\log(1 + CQI_{k,PU2RC,lower\ bound}) + \log\left(1 + \frac{1}{r}CQI_{MRC,k}\right)\right\}$$

While not required in all aspects, the second CQI generating unit 320 may generate second CQI that includes ZF-CQI associated with the ZF beamforming scheme based on the actually needed transmission rank r (i.e., the transmission rank corresponding to the number of data streams to be transmitted). The ZF-CQI $CQI_{k,ZF}$ may be represented according to Equation 9:

$$CQI_{k,ZF} = \frac{\frac{1}{r}CQI_{MRC,k}\cos^2\left(\frac{\theta_{max}}{2}\right)}{\left(1+\sqrt{2\left(1-\cos\frac{\theta_{max}}{2}\right)}\right)^2 + \frac{1}{r}CQI_{MRC,k}\sin^2\left(\frac{\theta_{max}}{2}\right)} \quad (9)$$

Referring to Equation 6 through Equation 9, when the user terminal k 123 feeds back, to the base station, the first CQI $CQI_{MRC,k}$ when the transmission rank is 1, the second CQI generating unit 320 corrects the first CQI $CQI_{MRC,k}$ based on the actual transmission rank r. The second CQI generating unit 320 may generate the ZF-CQI $CQI_{k,ZF}$ and the PU2RC-CQI $CQI_{k,PU2RC}$.

The user terminal k 123 may generate first CQI when the transmission rank is 1 and the transmission rank is a maximum allowance value, and feed back the generated first CQI. For example, the first CQI may include $CQI_{MRC,k}$ and $CQI_{k,delta}$. $CQI_{k,delta}$ relates to when the transmission rank is the maximum allowance value. The maximum allowance value of the transmission rank is determined as a smaller value between a number of transmitting antennas of the base station 110 and a number of receiving antennas of user terminals 121, 122, and 123.

Similarly, the second CQI may include the ZF-CQI generated according to Equation 9. When the first CQI when the transmission rank is the maximum allowance value and when the transmission rank is 1 is fed back, the PU2RC-CQI $CQI_{k,PU2RC}$ may be calculated according to the limit of Equation 7 and Equation 8, as well as according to the limit as given by the following Equation 10:

$$CQI_{k,PU2RC} \geq CQI_{k,PU2RC,lower\ bound} = \quad (10)$$

$$\max\left\{\frac{M}{r}CQI_{k,MMSE}, \frac{\frac{1}{r}\left\{\max\left(1-\sqrt{2\left(1-\cos\frac{\theta_{max}}{2}\right)},0\right)\right\}^2}{\frac{1}{r}\sum_y\left\{\frac{|(v_k^{(s)})^H v_k^{(y)}|+}{\sqrt{2\left(1-\cos\frac{\theta_{max}}{2}\right)}}\right\}^2 + \frac{1}{CQI_{MRC,k}}\left(1-\sqrt{2\left(1-\cos\frac{\theta_{max}}{2}\right)}\right)^2}\right\}$$

In Equation (10), $CQI_{k,MMSE}$ is a difference between $CQI_{MRC,k}$ and $CQI_{k,delta}$.

When the plurality of antennas is installed in the user terminal k 123, Equation 10 may be represented by the following Equation 11:

$$CQI_{k,PU2RC} \geq CQI_{k,PU2RC,lower\ bound} = \frac{M}{r}CQI_{k,MMSE}. \quad (11)$$

The second CQI generator 320 may generate second CQI that includes SDMA-CQI associated with the SDMA scheme based on an actually required transmission rank r.

The ideal SDMA-CQI ($CQI\_ideal_k^{SDMA}$) may be represented by the following Equation 12:

$$CQI\_ideal_k^{SDMA} = \frac{\frac{P}{r}|h_{com,k}v_k^{(s)}|^2}{\frac{P}{r}\sum_y|h_{com,k}v_k^{(y)}|^2 + 1} \quad (12)$$

$$= \frac{|1+e_k^H v_k^{(s)}|^2 CQI_k^{MRC}}{\sum_y |h_{com,k}v_k^{(y)}|^2 CQI_k^{MRC} + r|1+e_k^H v_k^{(s)}|^2}.$$

In Equation (12), $h_{eff,k}=h_{com,k}$ and P is a total transmission power. It is understood that the term "ideal" indicates when interference between an $i^{th}$ beam and a $j^{th}$ beam is minimized or is zero.

When an amplitude attenuation ratio A(i, j) is the ratio of the amplitude of the $i^{th}$ beam to the amplitude of the interference occurring in the $i^{th}$ beam due to the $j^{th}$ beam, the actual SDMA-CQI, $CQI_k^{SDMA}$, may be represented by the following Equation 13:

$$CQI_k^{SDMA} \leq \frac{t^2 CQI_k^{MRC}}{\sum_y A(s,y)^{-2} CQI_k^{MRC} + rt^2}. \quad (13)$$

In Equation (13), $t = \cos\frac{\theta_{max}}{2}$.

The beamforming mode determining unit 330 determines a beamforming mode based on the second CQI. The beamforming mode may use any one of a ZF beamforming scheme, a PU2RC scheme, and an SDMA scheme. Furthermore, the beamforming mode determining unit 230 may determine the beamforming mode according to a sum of data rates.

With respect to all of the user terminals 121, 122, and 123, $CQI_{k,PU2RC}$, $CQI_{k,ZF}$, and $CQI\_ideal_k^{SDMA}$ or $CQI_k^{SDMA}$ is calculated by the second CQI generating unit 320. The beamforming mode determining unit 330 determines which beamforming mode maximizes the sum of data rates based on $CQI_{k,PU2RC}$, $CQI_{k,ZF}$ $CQI_{k,ZF}$, and $CQI\_deal_k^{SDMA}$ or $CQI_k^{SDMA}$. For example, when the sum of data rates of when a beamforming mode using the PU2RC scheme or the SDMA scheme is selected is greater than the sum of data rates of when a beamforming vector using the ZF beamforming scheme is selected, the beamforming mode using the PU2RC scheme is determined as the beamforming mode. Therefore, according to an aspect of the present invention, it is possible to flexibly determine a beamforming vector based on the corrected second CQI. Also, it is possible to maximize advantages of different beamforming modes and counteract disadvantages thereof according to a changing radio environment.

The MCS level selecting unit 340 selects an MCS level corresponding to a radio channel based on the second CQI. Since the second CQI is generated by correcting the first CQI fed back from the user terminal, the second CQI may more accurately represent the radio channel. According to an aspect of the present invention, it is possible to use a link adaptation scheme based on more accurate second CQI.

The beamformer 350 generates a transmission signal by beamforming a data stream using the beamforming vector according to the determined beamforming mode. For example, when the beamforming scheme using the PU2RC scheme is determined as the beamforming mode, the beamformer 350 may perform beamforming for a data stream according to the PU2RC scheme using a unitary matrix. In this instance, various types of schemes may be used to select the user terminal. Similarly, when the ZF beamforming scheme or the SDMA scheme is determined as the beamforming mode, the beamformer 350 may perform beamforming for a data stream according to the ZF beamforming scheme or the SDMA scheme.

Although not illustrated in FIG. 3, the MIMO communication system 300 may further include an indication information transmitting unit to transmit to the user terminal at least one of first indication information associated with the beamforming vector, second indication information associated with the transmission rank, and third indication information associated with the beamforming mode. For example, the first indication information may be information to indicate the index of the beamforming vector. Accordingly, each of the user terminals 121, 122, and 123 may identify whether a received signal is for identifying the corresponding user terminal or another user terminal based on the first indication information.

In regards to the second indication information, for example, when the transmission rank is 3, the second indication information may include 3. In this case, when a single stream is allocated to each of the user terminals 121, 122, and 123, each of the user terminals 121, 122, and 123 may recognize that one stream is a desired stream and two streams are interference among the three streams.

The third indication information may include information regarding a scheme with which the base station 110 performed beamforming among the ZF beamforming scheme, the PU2RC scheme, and the SDMA scheme. Each of the user terminals 121, 122, and 123 may select an appropriate decoding scheme based on the third indication information.

Figure 4:
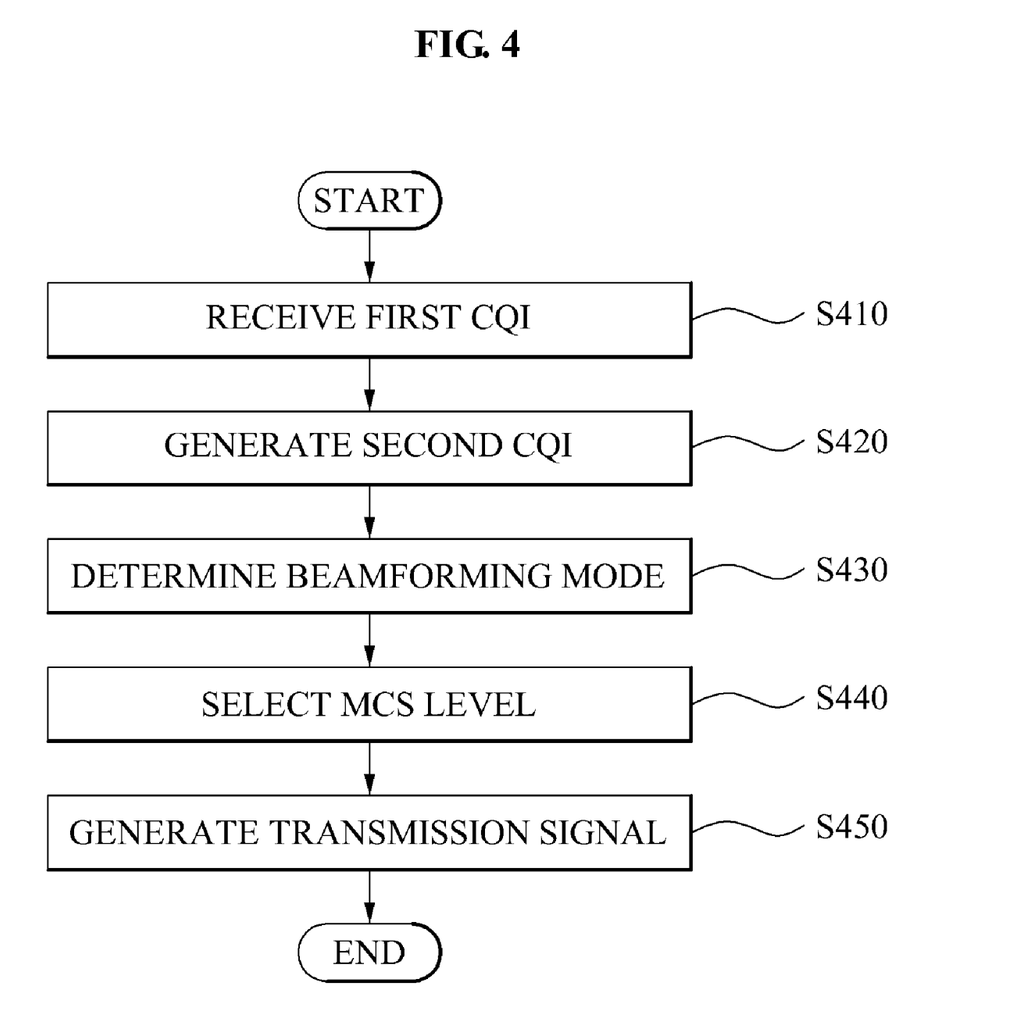
FIG. 4 is a flowchart illustrating a MIMO communication method according to an embodiment of the present invention.

FIG. 4 is a flowchart illustrating a MIMO communication method according to an embodiment of the present invention. Referring to FIG. 4, the MIMO communication system receives, from a user terminal, first CQI associated with a beamforming vector selected by the user terminal in operation S410.

Then, the MIMO communication system generates second CQI by correcting the first CQI based on a number of data streams to be transmitted in operation S420. According to an aspect of the present invention, operation S420 may include generating the second CQI based on a remaining beamforming vector that is selected by at least one other user terminal that is different from the user terminal that transmits the first CQI. However, it is understood that aspects of the present invention are not limited thereto. For example, according to another aspect of the present invention, operation S420 may include generating the second CQI to include a ZF-CQI associated with a ZF beamforming scheme, a PU2RC-CQI associated with a PU2RC scheme, and/or an SDMA-CQI associated with an SDMA scheme.

In operation S430, the MIMO communication method determines a beamforming mode based on the second CQI. According to an aspect of the present invention, operation S430 includes determining the beamforming mode based on the second CQI. The beamforming mode may use any one of a ZF beamforming scheme, a PU2RC scheme, and an SDMA scheme. However, it is understood that aspects of the present invention are not limited thereto. For example, according to another aspect of the present invention, operation S430 may include determining the beamforming mode based on a sum of data rate that is calculated based on the second CQI.

In operation S440, the MIMO communication method selects an MCS level corresponding to a radio channel based on the second CQI. Then, the MIMO communication method generates a transmission signal by beamforming the data stream using the beamforming vector according to the determined beamforming mode in operation S450.

Although not illustrated in FIG. 4, the MIMO communication method may further include transmitting, to the user terminal, at least one of first indication information associated with the beamforming vector, second indication information associated with the transmission rank, and third indication information associated with the beamforming mode.

Detailed descriptions not made with reference to FIG. 4 but made above with reference to FIGS. 1 through 3 are omitted herein.

The MIMO communication method according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined by the claims and their equivalents.

What is claimed is:

1. A base station included in a Multiple-Input Multiple-Output (MIMO) communication system configured to transmit or to receive data via a plurality of antennas with respect to a plurality of user terminals, the base station comprising:
a first channel quality information (CQI) receiving unit configured to receive first CQI from one of the user terminals when the transmission rank is any one of 1 and a maximum allowance value, the first CQI being associated with a beamforming vector selected by the user terminal; and
a second CQI generating unit configured to:
calculate a lower bound of a second CQI for an actual transmission rank based on the first CQI; and
generate the second CQI by correcting the first CQI with the lower bound of the second CQI, wherein the transmission rank of one user terminal is different from the transmission rank of another user terminal;
wherein the second CQI is generated based on interference caused by a remaining beamforming vector.

2. The base station as claimed in claim 1, wherein the second CQI generating unit is further configured to generate the second CQI based on a remaining beamforming vector that is selected by another one other user terminals that is different from the user terminal from which the first CQI was received.

3. The base station as claimed in claim 1, wherein the second CQI comprises zero-forcing (ZF)-CQI associated with a ZF beamforming scheme, Per-User Unitary Rate Control (PU2RC)-CQI associated with a PU2RC scheme, or spatial division multiplexing access (SDMA)-CQI associated with an SDMA scheme.

4. The base station as claimed in claim 1, further comprising a beamforming mode determining unit configured to determine a beamforming mode based on the second CQI, the beamforming mode used to transmit a data stream.

5. The base station as claimed in claim 4, wherein the beamforming mode determining unit is further configured to determine the beamforming mode to use a ZF beamforming scheme, a PU2RC scheme, or an SDMA scheme.

6. The base station as claimed in claim 4, wherein the beamforming mode determining unit is further configured to determine the beamforming mode based on a sum of data rates calculated according to the second CQI.

7. The base station as claimed in claim 4, further comprising an indication information transmitting unit configured to transmit, to the user terminal:
   first indication information associated with the beamforming vector;
   second indication information associated with the actual transmission rank; or
   third indication information associated with the beamforming mode.

8. The base station as claimed in claim 4, further comprising a beamformer configured to generate a transmission signal to the user terminal by beamforming the data stream using a beamforming vector according to the determined beamforming mode.

9. The base station as claimed in claim 1, further comprising a modulation coding scheme (MCS) level selecting unit configured to select an MCS level corresponding to a radio channel based on the second CQI.

10. The base station as claimed in claim 1, wherein the beamforming vector is selected from the user terminal as a column vector or a row vector that is included in at least one precoding matrix.

11. The base station as claimed in claim 1, wherein the generation of the second CQI by correcting the first CQI changes a value of the second CQI to be different from a value of the first CQI.

12. A method of a base station included in a Multiple-Input Multiple-Output (MIMO) communication system for transmitting or receiving data via a plurality of antennas with respect to a plurality of user terminals, the method comprising:
   receiving first channel quality information (CQI) from one of the user terminals when the transmission rank is any one of 1 and a maximum allowance value, the first CQI associated with a beamforming vector selected by the user terminal;
   calculating a lower bound of a second CQI for an actual transmission rank based on the first CQI; and
   generating the second CQI by correcting the first CQI with the lower bound of the second CQI, wherein the transmission rank of one user terminal is different from the transmission rank of another user terminal;
   wherein the second CQI is generated based on interference caused by a remaining beamforming vector.

13. The method as claimed in claim 12, wherein the generating of the second CQI comprises generating the second CQI based on a remaining beamforming vector that is selected by another one other user terminals that is different from the user terminal from which the first CQI was received.

14. The method as claimed in claim 12, wherein the second CQI comprises zero-forcing (ZF)-CQI associated with a ZF beamforming scheme, Per-User Unitary Rate Control (PU2RC)-CQI associated with a PU2RC scheme, or spatial division multiplexing access (SDMA)-CQI associated with an SDMA scheme.

15. The method as claimed in claim 12, further comprising determining a beamforming mode based on the second CQI, the beamforming mode used to transmit a data stream.

16. The method as claimed in claim 15, wherein the determining of the beamforming mode comprises determining the beamforming mode to use a ZF beamforming scheme, a PU2RC scheme, or an SDMA scheme.

17. The method as claimed in claim 15, wherein the determining of the beamforming mode comprises determining the beamforming mode based on a sum of data rates calculated according to the second CQI.

18. The method as claimed in claim 15, further comprising transmitting, to the user terminal:
   first indication information associated with the beamforming vector;
   second indication information associated with the actual transmission rank; or
   third indication information associated with the beamforming mode.

19. The method as claimed in claim 15, further comprising generating a transmission signal to the user terminal by beamforming the data stream using a beamforming vector according to the determined beamforming mode.

20. The method as claimed in claim 12, further comprising selecting a modulation coding scheme (MCS) level corresponding to a radio channel based on the second CQI.

21. The method as claimed in claim 12, wherein the beamforming vector is selected from the user terminal as a column vector or a row vector that is included in at least one precoding matrix.

22. A non-transitory computer-readable recording medium encoded with the method of claim 12 and implemented by a computer.

23. The method as claimed in claim 12, wherein the generating of the second CQI by correcting the first CQI changes a value of the second CQI to be different from a value of the first CQI.

* * * * *